No. 682,439. Patented Sept. 10, 1901.
J. S. WARDE.
METER.
(Application filed Dec. 18, 1900.)

(No Model.)

WITNESSES:

INVENTOR
John S. Warde
BY
ATTORNEYS

UNITED STATES PATENT OFFICE.

JOHN SEYMOUR WARDE, OF WEST NEW BRIGHTON, NEW YORK.

METER.

SPECIFICATION forming part of Letters Patent No. 682,439, dated September 10, 1901.

Application filed December 18, 1900. Serial No. 40,256. (No model.)

*To all whom it may concern:*

Be it known that I, JOHN SEYMOUR WARDE, a citizen of the United States, and a resident of the city of New York, West New Brighton, borough of Richmond, in the county of Richmond and State of New York, have invented a new and Improved Meter, of which the following is a full, clear, and exact description.

This invention relates to improvements in meters for water, gas, and the like, and the object is to provide a meter with a valve at its inlet, so that should the meter be reversed on the service-pipe by the consumer it will be prevented from operating its gearing and dial-handles backward, and, further, to prevent a back draft from any cause, such as a break in the main, to reverse the movement of the dial mechanism.

I will describe a meter embodying my invention and then point out the novel features in the appended claim.

Reference is to be had to the accompanying drawings, forming a part of this specification, in which similar characters of reference indicate corresponding parts in both the figures.

Figure 1:
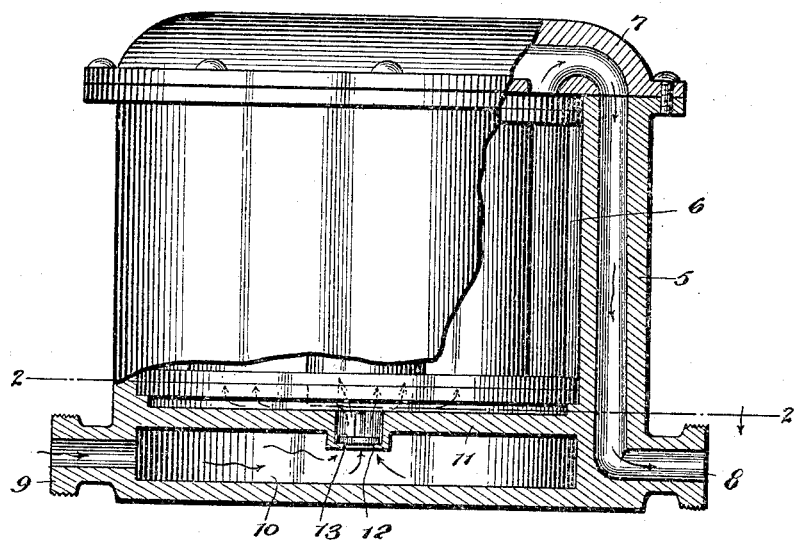
Figure 2:
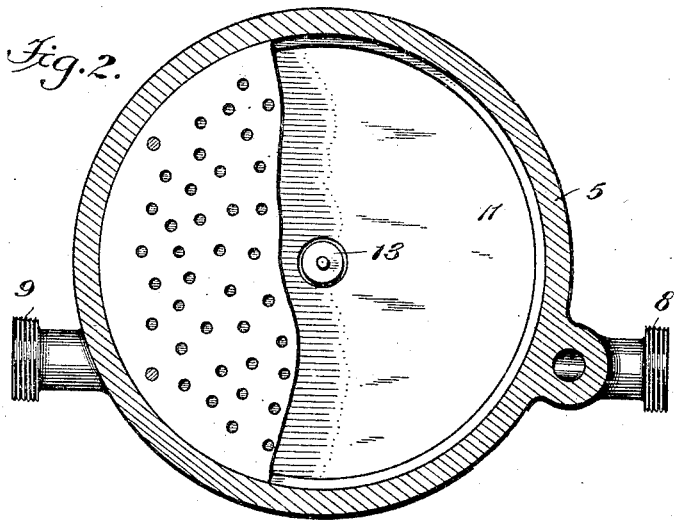

Figure 1 is a partial section and partial elevation of a meter embodying my invention, and Fig. 2 is a section on the line 2 2 of Fig. 1.

The meter comprises a casing 5, within which is a cylinder 6, and secured to the top of the casing is a dome 7. These parts are of the usual construction, and a discharge or outlet leads from the dome through the wall of the casing and through the pipe connection 8. The inlet connection 9 communicates with a chamber 10 in the lower portion of the meter-casing, and in the upper wall 11 of this chamber is an opening which provides communication between said chamber and the cylinder 6. In this opening is a valve-seat 12 for a valve 13, which may be of the ordinary check-valve variety.

In operation the water or gas passing through the inlet 9 will force the valve 13 sufficiently open, so that the water or gas may pass through the perforated plate within the wall 11 and through the meter and operate the parts in the usual manner and then pass into the house or distributing pipes. Should a consumer or dishonest person reverse the meter—that is, connect the outlet-tube 8 with the main or supply pipe—the water or gas by engaging with the upper side of the valve 13 will move and hold it in its closed position, and therefore as there will be at this time no circulation of water or gas the dial mechanism will not be operated.

Having thus described my invention, I claim as new and desire to secure by Letters Patent—

A meter, comprising a casing, a dome on said casing and from which an outlet leads through the wall of the casing, a receiving-chamber below the casing, the upper wall of said chamber having an opening, a perforated plate above said upper wall, and a valve seated in the opening of said upper wall, substantially as specified.

In testimony whereof I have signed my name to this specification in the presence of two subscribing witnesses.

JOHN SEYMOUR WARDE.

Witnesses:
 JOHN F. SMITH,
 JAMES COX.